(12) United States Patent
Chung

(10) Patent No.: US 8,657,081 B2
(45) Date of Patent: Feb. 25, 2014

(54) DISC BRAKE

(75) Inventor: Suk Hoon Chung, Pyeongtaek-si (KR)

(73) Assignee: Mando Corporation, Gyeonggi-Do (KR)

( * ) Notice: Subject to any disclaimer, the term of this patent is extended or adjusted under 35 U.S.C. 154(b) by 215 days.

(21) Appl. No.: 12/652,613

(22) Filed: Jan. 5, 2010

(65) Prior Publication Data
US 2010/0170756 A1 Jul. 8, 2010

(30) Foreign Application Priority Data

Jan. 5, 2009 (KR) .................. 10-2009-0000399

(51) Int. Cl.
*F16D 65/04* (2006.01)

(52) U.S. Cl.
USPC .................. 188/250 G; 188/250 B

(58) Field of Classification Search
USPC ....... 188/73.37, 234, 250 R, 258, 261, 250 D, 188/250 E, 250 G, 250 B; D12/180
See application file for complete search history.

(56) References Cited

U.S. PATENT DOCUMENTS

| | | | | |
|---|---|---|---|---|
| 1,771,595 A * | 7/1930 | Thompson | .................. | 188/234 |
| 2,451,326 A * | 10/1948 | Eksergian et al. | .................. | 188/234 |
| 3,198,294 A * | 8/1965 | Stacy | .................. | 188/234 |
| 3,297,117 A * | 1/1967 | Freholm | .................. | 188/234 |
| 3,400,789 A * | 9/1968 | Mione | .................. | 188/264 AA |
| 3,503,475 A * | 3/1970 | Mione | .................. | 188/250 R |
| 5,285,873 A * | 2/1994 | Arbesman | .................. | 188/73.1 |
| 5,427,213 A * | 6/1995 | Weiler et al. | .................. | 188/250 E |
| 5,538,108 A * | 7/1996 | Russo | .................. | 188/250 E |
| 5,842,546 A * | 12/1998 | Biswas | .................. | 188/73.37 |
| 6,116,384 A * | 9/2000 | Matsumoto et al. | .................. | 188/73.31 |
| 6,913,120 B2* | 7/2005 | Bosco et al. | .................. | 188/73.37 |
| 7,370,736 B2* | 5/2008 | Anda et al. | .................. | 188/73.36 |
| 7,648,007 B2* | 1/2010 | Russo et al. | .................. | 188/250 E |
| 2006/0151267 A1* | 7/2006 | Russo et al. | .................. | 188/250 B |
| 2007/0246315 A1* | 10/2007 | Bosco, Jr. | .................. | 188/250 B |

(Continued)

FOREIGN PATENT DOCUMENTS

DE 202 05 315 U1 7/2002
JP 58-156731 9/1983

(Continued)

OTHER PUBLICATIONS

English-language abstract of JP 58-207535.*

(Continued)

*Primary Examiner* — Bradley King
*Assistant Examiner* — Nicholas J Lane
(74) *Attorney, Agent, or Firm* — McDermott Will & Emery LLP

(57) ABSTRACT

Disclosed herein is a disc brake to allow a shim to be easily coupled to a pad plate and to maintain strong coupling between the shim and the pad plate so as to prevent separation of the mounted shim. The disc brake includes pad plates each having frictional pads, a piston and a caliper housing to press the pad plates toward a disc, a shim attached to one surface of each of the pad plates to be pressed by the piston or the caliper housing, a coupling hook protruding from the shim and having a coupling protrusion at an end thereof, and a coupling hole perforated in each of the pad plates to allow the coupling hook to be inserted and coupled into the coupling hole.

8 Claims, 4 Drawing Sheets

(56) References Cited

U.S. PATENT DOCUMENTS

| | | | |
|---|---|---|---|
| 2008/0257664 A1* | 10/2008 | Holme et al. | 188/250 B |
| 2008/0257665 A1* | 10/2008 | Roehling | 188/250 G |
| 2010/0084227 A1* | 4/2010 | Lin et al. | 188/73.37 |

FOREIGN PATENT DOCUMENTS

| | | | |
|---|---|---|---|
| JP | 58207535 A * | 12/1983 | F16D 65/04 |
| JP | 58211032 A * | 12/1983 | F16D 65/04 |
| JP | 60-8534 | 1/1985 | |
| KR | 20-1998-0009508 | 4/1998 | |
| KR | 20-0171109 | 5/2000 | |
| KR | 10-0808473 | 3/2008 | |

OTHER PUBLICATIONS

English-language abstract of JP 58-211032.*

German Office Action, w/ partial English translation thereof, issued in German Patent Application No. 10 2010 004 012.6 dated Oct. 21, 2011.

English Translation of Chinese Office Action, issued in Chinese Patent Application No. 201010002311.3, dated Sep. 26, 2011.

Chinese Office Action, and English translation thereof, issued in Chinese Patent Application No. 201010002311.3 dated Aug. 2, 2012.

Korean Office Action, w/ English translation thereof, issued in Korean Patent Application No. KR 10-2009-0000399 dated Jan. 25, 2013.

* cited by examiner

DISC BRAKE

CROSS-REFERENCE TO RELATED APPLICATION

This application claims the benefit of Korean Patent Application No. 2009-0000399, filed on Jan. 5, 2009 in the Korean Intellectual Property Office, the disclosure of which is incorporated herein by reference.

BACKGROUND

1. Field

Embodiments of the present invention relate to a disc brake having an improved coupling structure of a shim to be mounted to a surface of a pad plate.

2. Description of the Related Art

Generally, a disc brake is designed to generate braking force by pressing both surfaces of a disc using frictional pads. The disc brake includes a disc adapted to be rotated along with a wheel, inner and outer pad plates coupled to both surfaces of the disc and having frictional pads attached thereto, and a piston and a caliper housing to press the respective pad plates.

Shims in the form of thin plates are coupled to the inner and outer pad plates at opposite sides of the frictional pads. The shims serve to prevent heat and vibration generated during braking from being transmitted to the piston and the caliper housing and to reduce vibration noise.

To couple each shim to the surface of the corresponding pad plate, conventionally, a method to attach the shim to the surface of the pad plate using an adhesive has been used, or a method to allow a bent rim portion of the shim to be caught by a rim portion of the pad plate has been used.

However, the method to attach the shim to the pad plate using an adhesive may complicate manufacture and may entail high manufacturing costs. Also, the method to allow the bent rim portion of the shim to be caught by the pad plate may have poor coupling force, causing unwanted separation of the shim from the pad plate.

SUMMARY

Therefore, it is an aspect of the present invention to provide a disc brake to allow a shim to be easily coupled to a pad plate and to maintain strong coupling between the shim and the pad plate so as to prevent separation of the mounted shim.

Additional aspects of the invention will be set forth in part in the description which follows and, in part, will be obvious from the description, or may be learned by practice of the invention.

In accordance with an aspect of an exemplary embodiment of the present invention, in a disc brake including pad plates each having frictional pads, a piston and a caliper housing to press the pad plates toward a disc, and a shim attached to one surface of each of the pad plates to be pressed by the piston or the caliper housing, the disc brake further includes a coupling hook protruding from the shim and having a coupling protrusion at an end thereof, and a coupling hole perforated in each of the pad plates to allow the coupling hook to be inserted and coupled into the coupling hole, wherein the coupling hole is perforated in a central portion of the pad plate through both surfaces of the pad plate, and wherein the frictional pads of each of the pad plates include a first frictional pad and a second frictional pad separately coupled to the other surface of the pad plate at opposite sides of the coupling hole so as to be separated from each other for coupling of the coupling hook.

The coupling hook and the coupling hole may be elongated in a longitudinal direction of a recess defined between the first frictional pad and the second frictional pad, and the coupling protrusion of the coupling hook may be larger than the coupling hole and is smaller than a distance between the first frictional pad and the second frictional pad.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
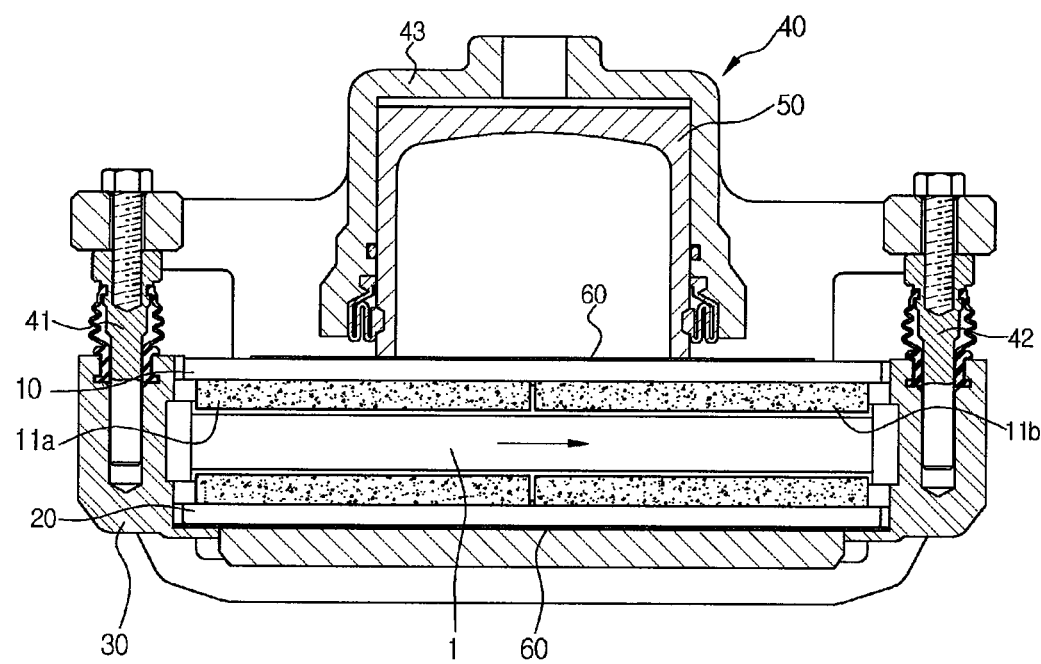
FIG. 1 is a sectional view illustrating a configuration of a disc brake according to an exemplary embodiment of the present invention.

Reference will now be made in detail to the embodiment of the present invention, examples of which are illustrated in the accompanying drawings, wherein like reference numerals refer to like elements throughout.

Referring to FIG. 1, a disc brake according to an exemplary embodiment, includes a disc 1 adapted to be rotated along with a wheel, inner and outer pad plates 10 and 20 arranged respectively at opposite sides of the disc 1 to press and brake the disc 1, a carrier 30 mounted to a vehicle body to support the pad plates 10 and 20, a caliper housing 40 supported on the carrier 30 so as to be movable forward or rearward, and a piston 50 installed in the caliper housing 40.

The caliper housing 40 is forwardly or rearwardly movably supported on the carrier 30 using guide rods 41 and 42 provided at opposite sides of the caliper housing 40. The caliper housing 40 includes a cylinder 43, and the piston 50 is installed in the cylinder 43. If brake oil is introduced into the cylinder 43 to generate hydraulic braking pressure, the piston 50 presses the inner pad plate 10 toward the disc 1. In this case, under influence of repulsive force of the piston 50, the caliper housing 40 is moved in an opposite direction of the piston 50, thus acting to press the outer pad plate 20 toward the disc 1. In this way, braking of the disc 1 is accomplished.

The inner and outer pad plates 10 and 20 have substantially the same shape. Thus, the following description is focused on the inner pad plate 10 and for convenience of description, the inner pad plate 10 is referred to as a "pad plate".

Figure 2:
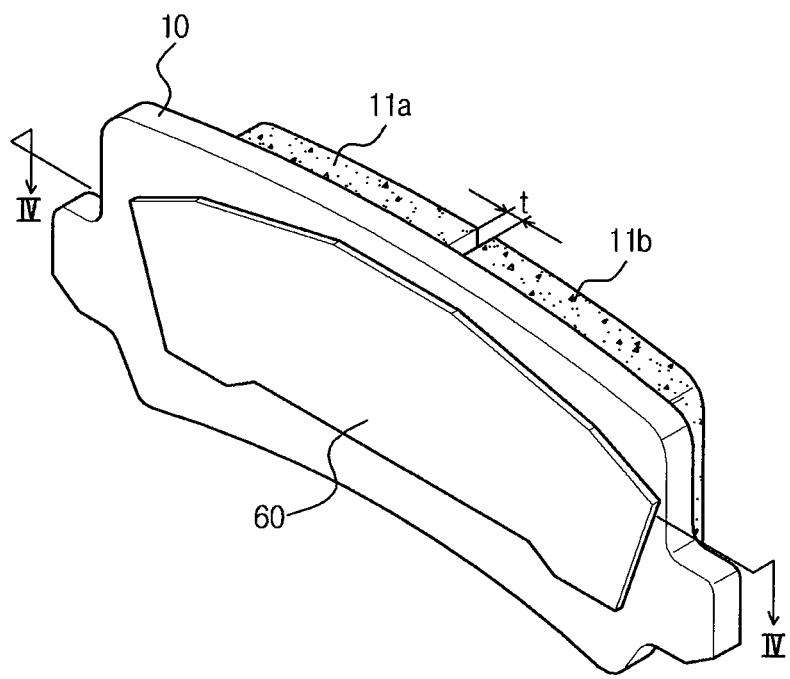
FIG. 2 is a perspective view illustrating a shim coupled to a pad plate of a disc brake according to an exemplary embodiment.

As shown in FIG. 2, the pad plate 10 has a first frictional pad 11a and a second frictional pad 11b attached to one surface of the pad plate 10, to generate braking force via friction with the disc 1. A shim 60 is coupled to the other surface of the pad plate 10, i.e. at an opposite side of the first and second frictional pads 11a and 11b. The shim 60 serves to prevent heat and vibration generated during braking from being transmitted to the piston 50 or the caliper housing 40 and to reduce vibration noise.

Figure 3:
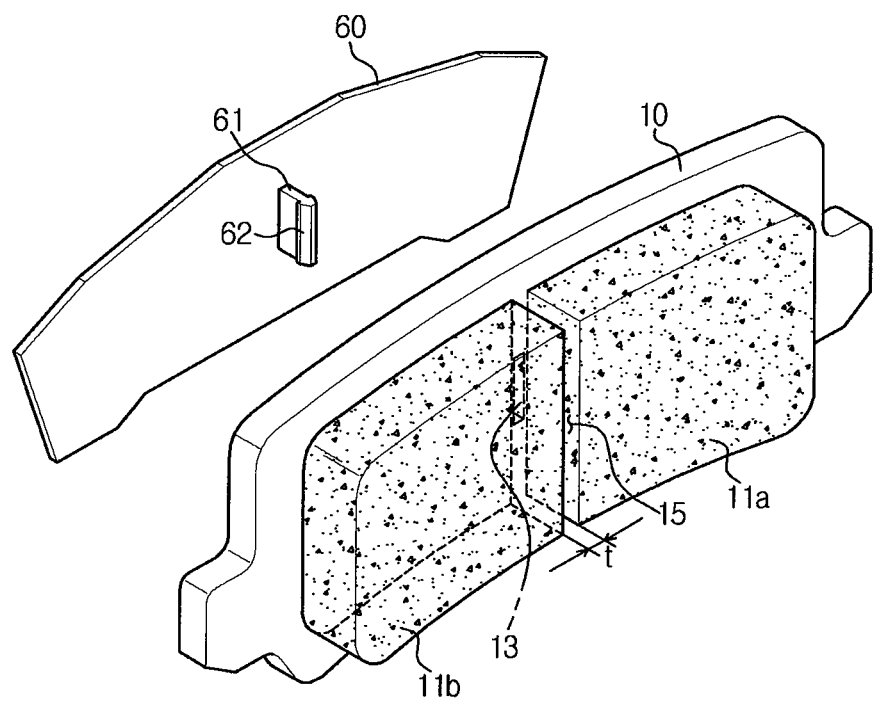
FIG. 3 is a perspective view illustrating a shim separated from a pad plate of a disc brake according to an exemplary embodiment.
Figure 4:
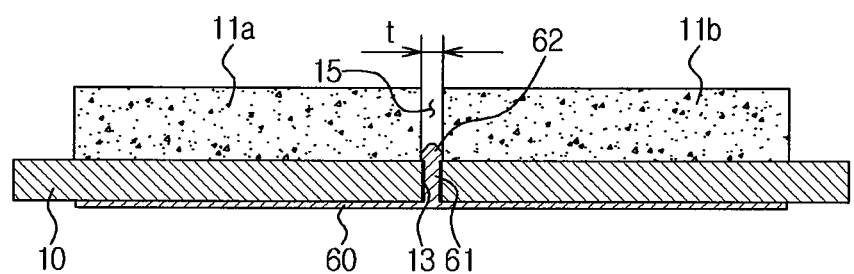
FIG. 4 is a sectional view taken along the line IV-IV of FIG. 2.

The shim 60 takes the form of a thin plate coated at both surfaces thereof with, e.g., elastic rubber for vibration reduction. To couple the shim 60 to the pad plate 10, as shown in FIGS. 3 and 4, the shim 60 has a coupling hook 61 protruding from the center of the shim 60 toward the pad plate 10, an end of which is formed with a coupling protrusion 62. The pad plate 10 has a coupling hole 13 for insertion of the coupling hook 61. The coupling hole 13 is perforated through both the surfaces of the pad plate 10 to assure passage of the coupling hook 61. The first frictional pad 11a and the second frictional pad 11b are coupled separately to the pad plate 10 at opposite sides of the coupling hole 13 so as to be separated from each other. This configuration serves to allow the coupling hook 61, having passed through the coupling hole 13, to be introduced into a recess 15 between the first frictional pad 11a and the second frictional pad 11b upon coupling of the shim 60.

The coupling hook 61 and the coupling hole 13 are elongated in a longitudinal direction (i.e., a vertical direction of FIG. 3) of the recess 15 between the first frictional pad 11a and the second frictional pad 11b. This configuration serves to limit rotation of the shim 60 relative to the pad plate 11 after the coupling hook 61 is inserted and coupled into the coupling hole 13.

The coupling protrusion 62 of the coupling hook 61 is slightly larger than the coupling hole 13, so as to be caught by the pad plate 10 after passing through the coupling hole 13, but is smaller than a distance t between the first frictional pad 11a and the second frictional pad 11b. This size of the coupling protrusion 62 may prevent separation of the shim 60 coupled to the pad plate 10 and also, may prevent the coupling protrusion 62 of the coupling hook 61 from interfering with the first and second frictional pads 11a and 11b.

The shim 60 may be formed via injection molding assuming that the shim 60 is made of resin. In this case, the coupling hook 61 may be integrally formed with the shim 60. In an alteration wherein the shim 60 is made of metal, the coupling hook 61 may be coupled to the shim 60 via welding or soldering.

The above described shim 60 may be completely coupled to the pad plate 10 by simply pressing and inserting the coupling hook 61 through the coupling hole 13, assuring easy installation of the shim 60 with respect to the pad plate 10. After the shim 60 is coupled to the pad plate 10, the coupling protrusion 62 is continuously caught by the coupling hole 13 to maintain strong mutual coupling, preventing the shim 60 from being separated from the pad plate 10.

As apparent from the above description, in a disc brake according to an exemplary embodiment of the present invention, a shim may be completely coupled to a pad plate by simply pressing and inserting a coupling hook of the shim through a coupling hole of the pad plate, whereby the shim may be easily coupled to the pad plate. Further, once the shim is coupled to the pad plate, the coupling hook may be caught by the coupling hole to maintain strong mutual coupling, whereby it may be possible to prevent separation of the shim from the pad plate.

Although the embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake comprising: pad plates each having frictional pads; a piston and a caliper housing to press the pad plates toward a disc; and a shim attached to one surface of each of the pad plates to be pressed by the piston or the caliper housing, the disc brake further comprising:
   a coupling hook protruding from the shim and having a coupling protrusion at an end thereof; and
   a coupling hole perforated in each of the pad plates to allow the coupling hook to be inserted and coupled into the coupling hole,
   wherein the coupling hole is perforated in a central portion of the pad plate through both surfaces of the pad plate,
   wherein the frictional pads of each of the pad plates include a first frictional pad and a second frictional pad separately coupled to the other surface of the pad plate at opposite sides of the coupling hole so as to be separated from each other,
   wherein the coupling hook is press-fit into the coupling hole to prevent separation of the shim from the pad plate,
   wherein the coupling hook and the coupling hole are elongated in a radial direction of the disc, and
   wherein the coupling hook is integrally formed with the shim.

2. The disc brake according to claim 1, wherein:
   the coupling hook and the coupling hole are elongated in a longitudinal direction of a recess defined between the first frictional pad and the second frictional pad; and
   the coupling protrusion of the coupling hook is larger than the coupling hole and is smaller than a distance between the first frictional pad and the second frictional pad.

3. The disc brake according to claim 1, wherein the shim is thinner than the pad plate.

4. The disc brake according to claim 1, wherein the coupling protrusion is elongated in a radial direction of the disc.

5. The disc brake according to claim 1, wherein the coupling hook is integrally formed with the shim via injection molding.

6. The disc brake according to claim 5, wherein the shim is made of resin.

7. The disc brake according to claim 1, wherein the coupling hook is integrally formed with the shim via welding or soldering.

8. The disc brake according to claim 7, wherein the shim is made of metal.

* * * * *